(12) United States Patent
Prescott

(10) Patent No.: US 8,281,625 B2
(45) Date of Patent: Oct. 9, 2012

(54) LOCKING SKEWER FOR SECURING BIKES TO A RACK

(75) Inventor: Keith L. Prescott, Cambridge, VT (US)

(73) Assignee: Thule Sweden AB (SE)

( * ) Notice: Subject to any disclaimer, the term of this patent is extended or adjusted under 35 U.S.C. 154(b) by 371 days.

(21) Appl. No.: 12/510,569

(22) Filed: Jul. 28, 2009

(65) Prior Publication Data
US 2010/0154488 A1 Jun. 24, 2010

Related U.S. Application Data

(60) Provisional application No. 61/084,210, filed on Jul. 28, 2008.

(51) Int. Cl.
*E05B 71/00* (2006.01)
(52) U.S. Cl. .............. 70/19; 70/62; 70/201; 70/225; 70/233; 70/261; 211/5; 301/110.5; 301/124.2
(58) Field of Classification Search .......... 70/204–206, 70/233–236, 19, 62, 261, 225, 201, 258, 70/181, 202, 210; 280/288.4; 301/124.2, 301/110.5; 403/314, 320; 211/5, 8, 9; 224/322–324, 924, 935, 569, 424
See application file for complete search history.

(56) References Cited

U.S. PATENT DOCUMENTS

| | | | | |
|---|---|---|---|---|
| 4,114,409 A | * | 9/1978 | Scire | 70/225 |
| 4,621,873 A | * | 11/1986 | Weinstein et al. | 301/124.1 |
| 4,724,692 A | * | 2/1988 | Turin et al. | 70/225 |
| 4,770,011 A | * | 9/1988 | Constant | 70/225 |
| 4,964,287 A | * | 10/1990 | Gaul | 70/233 |
| 5,027,628 A | * | 7/1991 | De Rocher et al. | 70/233 |
| 5,291,763 A | * | 3/1994 | Cuisinot | 70/201 |
| 5,479,836 A | * | 1/1996 | Chang | 74/551.1 |
| 5,511,894 A | | 4/1996 | Ng | |
| 5,516,017 A | | 5/1996 | Arvidsson | |
| 5,526,661 A | * | 6/1996 | Lin | 70/233 |
| 5,598,959 A | * | 2/1997 | Lorensen et al. | 224/315 |
| 5,813,258 A | * | 9/1998 | Cova et al. | 70/225 |
| 5,875,947 A | | 3/1999 | Noel et al. | |
| 6,167,175 A | | 12/2000 | Zheng et al. | |
| 6,202,458 B1 | | 3/2001 | Buchalter | |

(Continued)

FOREIGN PATENT DOCUMENTS
EP 0588409 A 3/1994

OTHER PUBLICATIONS

International Search Report and Written Opinion dated Sep. 30, 2009, in Application No. PCT/US09/51952.

*Primary Examiner* — Lloyd Gall
(74) *Attorney, Agent, or Firm* — Novak Druce + Quigg LLP

(57) ABSTRACT

A skewer assembly for a rack mount having a cam disposed against a cam follower actuable from an open configuration to a closed configuration, the skewer assembly further having a lock assembly integrated with the cam follower and a locking member located within a radial contact surface perimeter of the cam. The skewer further having a tightening assembly with a ratcheting nut which is incapable of being loosened when the skewer is placed in tension. Moreover, the skewer assembly covers the access holes to the internal hardware of the rack mount when inserted therein.

16 Claims, 5 Drawing Sheets

U.S. PATENT DOCUMENTS

| | | | |
|---|---|---|---|
| 6,408,659 B1 * | 6/2002 | Chang | 70/19 |
| 6,460,708 B2 | 10/2002 | Dean et al. | |
| RE38,094 E * | 4/2003 | Buchalter | 70/233 |
| 6,601,712 B2 | 8/2003 | Dean et al. | |
| 6,758,380 B1 * | 7/2004 | Kolda | 224/315 |
| 6,761,417 B2 * | 7/2004 | Denby | 301/124.2 |
| 6,938,782 B2 * | 9/2005 | Dean et al. | 211/20 |
| 7,866,193 B2 * | 1/2011 | Tribout | 70/233 |
| 2002/0026816 A1 * | 3/2002 | Katsouros et al. | 70/233 |
| 2004/0011091 A1 * | 1/2004 | Zeuschner | 70/19 |
| 2005/0120762 A1 * | 6/2005 | Denby | 70/233 |
| 2005/0205627 A1 | 9/2005 | Dean | |
| 2006/0054573 A1 | 3/2006 | Dean et al. | |
| 2007/0119887 A1 | 5/2007 | Foley | |
| 2007/0210127 A1 | 9/2007 | Book et al. | |
| 2008/0087058 A1 * | 4/2008 | Chang | 70/233 |
| 2008/0115547 A1 * | 5/2008 | Chang | 70/233 |

* cited by examiner

LOCKING SKEWER FOR SECURING BIKES TO A RACK

CROSS REFERENCE TO RELATED APPLICATIONS

The present application claims priority to provisional application U.S. 61/084,210 filed Jul. 28, 2008. Said provisional application is hereby expressly incorporated by reference into the present application in its entirety.

TECHNICAL FIELD

The present invention relates to a fork mount for mounting bicycles to load carriers and rack assemblies. In particular the invention relates to an improved locking skewer for increasing the security of a bicycle attached to a fork mount and preventing unauthorized removal.

BACKGROUND ART

As bicycling becomes an ever more popular sport, the interest in facilitating the transport, use and security of the bicycles and associated equipment increases as well. One well known apparatus in the art includes fork mount assemblies, which allow people to mount their bicycles on load carriers or racks for transportation or storage. Generally, one or more wheels of the bike are removed enabling the exposed forks to be placed on a skewer of the fork mount and then tightened or secured.

An important concern is the security of the bicycle for preventing theft or unauthorized removal. In the past locks have been incorporated with the skewer of the fork mount. However, often the locks are integrated with the cam lever and thus secure to a portion of the skewer outside of the cam assembly. As a result, tampering of the locking mechanism is made easier. What is needed therefore is a cam assembly that better integrates and secures the locking assembly and mechanism to reduce avenues for defeating security measures.

SUMMARY OF THE INVENTION

The multiple embodiments of the present invention provide an apparatus for improved security of a rack mount and skewer for the prevention of theft and tampering. Some embodiments include a locking skewer assembly configured for entry through an aperture of a fork mount and receiving forks of a bicycle for mounting thereon, the skewer including:

a longitudinal skewer member having a cam end and an adjustment end each located on opposing ends of said member;

the cam end having a cam disposed against at least one surface of a cam follower with said cam being rotatably moveable about a pivot point by a lever in communication therewith from an open configuration to a closed configuration wherein the cam follower is moved along the skewer to a position closer to said adjustment end, the cam having a radial contact surface perimeter with the cam follower, the surface perimeter extending from a first point of contact with the cam follower when the cam is in the open configuration to a second point of contact with the cam follower when the cam is in the closed configuration, the cam having a locking member located in an area between the contact surface perimeter and the pivot point in both the closed configuration and open configuration, and wherein the cam follower has a locking assembly integrated therein and being configurable to lock the locking member in place when cam is in the closed position whereby movement of the cam and cam follower is prevented.

In further embodiments, the locking member is a lock pin and is received by an elongate aperture in the cam follower, the elongate aperture extending in the same longitudinal direction of the longitudinal skewer.

In additional embodiments the cam follower has at least one contact surface extending from a side of a front end of said cam follower with the radial contact surface perimeter being disposed against the cam follower contact surface in both the open and closed configurations, the front end being the cam follower end which receives the longitudinal skewer member.

In still further embodiments, the radial contact surface comprises two contact surfaces arranged on both sides of the cam follower which are disposed against two contact surfaces of the cam follower in both the open and closed configurations.

In other embodiments a lever can extend from the cam for rotation of the cam by a user.

Furthermore, the cam follower can contain a nose portion having a spring which biases the cam follower against the cam. Additionally, the locking the adjustment end of the skewer member comprises a ratcheting adjustment nut.

In still further embodiments, the fork mount includes at least one access hole in a top portion of the fork mount aligned with said longitudinal skewer when skewer is inserted therein. Also, the fork mount may have an attachment bolt inserted in a bottom portion of the fork mount, the attachment bolt having at least one attachment nut aligned with at least one access hole, wherein access through the at least one access hole to the attachment bolt is blocked by the longitudinal skewer when the skewer is inserted in said fork mount.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF THE INVENTION

The present invention will now be more described and disclosed in greater detail. It is to be understood, however, that the disclosed embodiments are merely exemplary of the invention and that the invention may be embodied in various and alternative forms. It should also be understood that the accompanying figures are not necessarily to scale and some features may be exaggerated, or minimized, to show details of particular components. Therefore, specific structural and functional details disclosed herein are not to be interpreted as limiting the scope of the claims, but are merely provided as an example to teach one having ordinary skill in the art to make and use the invention.

Figure 1:
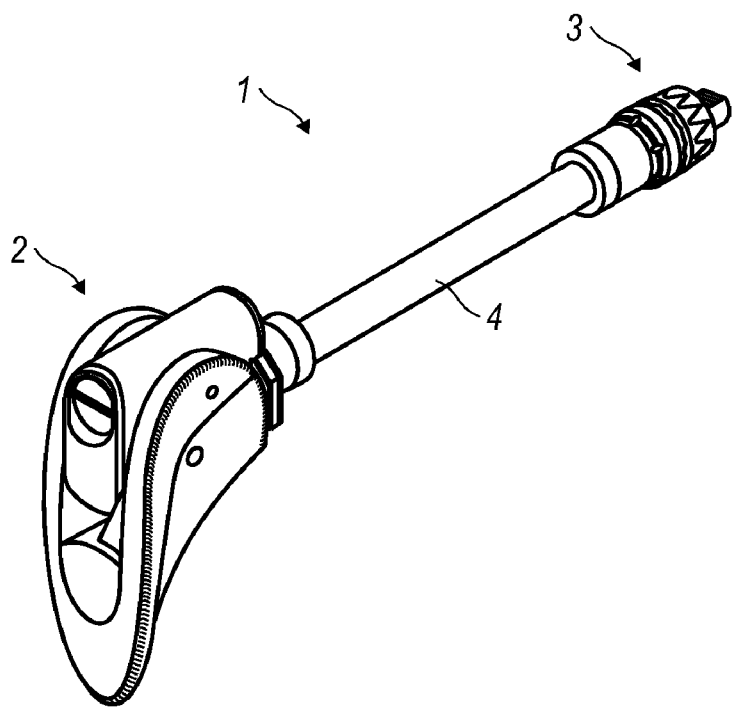
FIG. 1 is a partial perspective view of the skewer assembly fully assembled in accordance with an exemplary embodiment.
Figure 2:
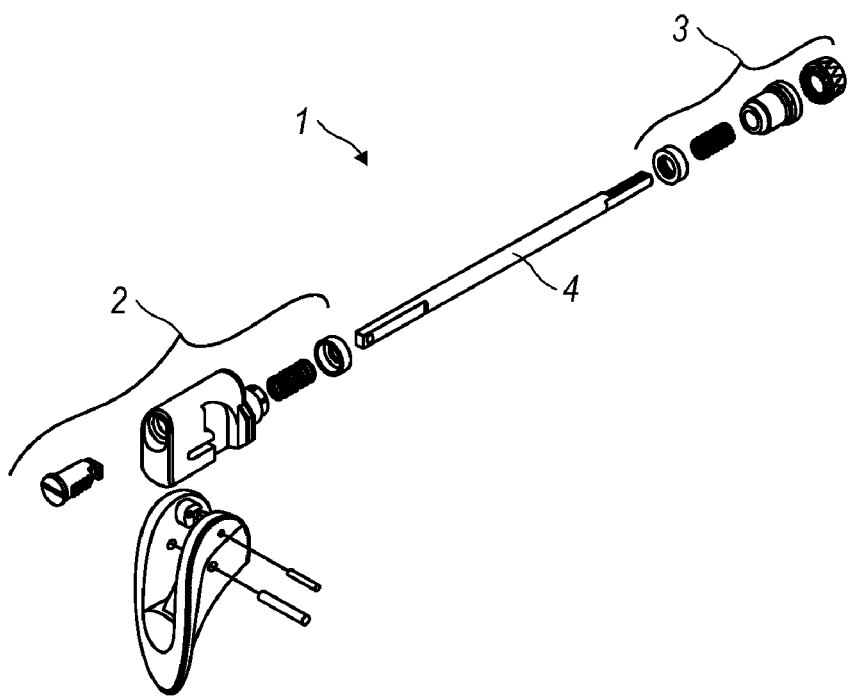
FIG. 2 is a partial perspective view of the skewer assembly disassembled in part in accordance with an exemplary embodiment.

Some embodiments of the skewer assembly 1 are shown in FIGS. 1-2. It will be appreciated that the skewer assembly 1 is shown assembled in FIG. 1 and has a cam assembly 2, a tightening assembly 3 interconnected by elongate skewer member 4. FIG. 2 illustrates this same skewer assembly 1 disassembled to show how the various pieces may be connected.

Figure 3:
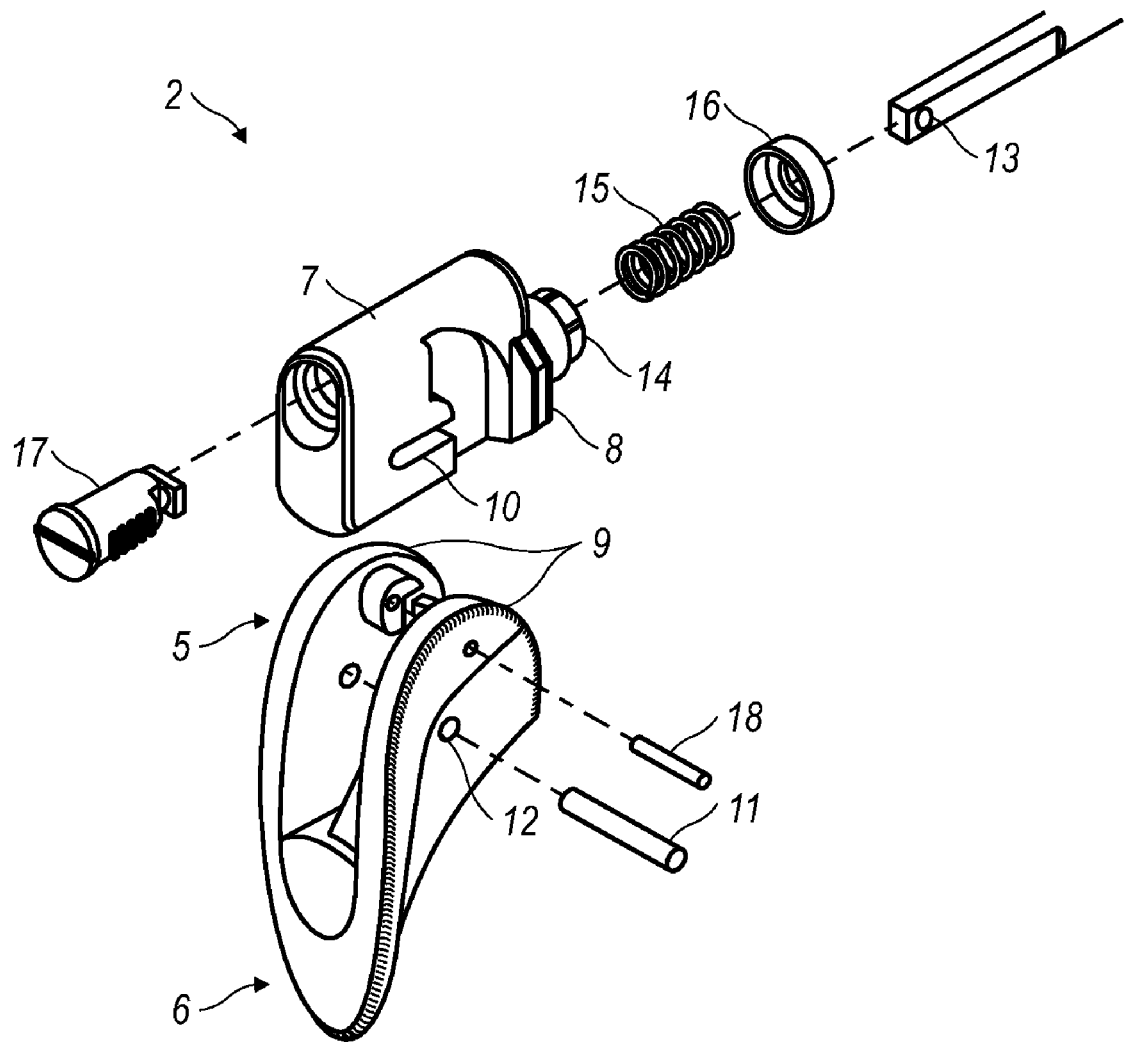
FIG. 3 is a partial perspective view of the cam assembly disassembled in part in accordance with an exemplary embodiment.

Referring now to FIG. 3 depicting one embodiment of the cam assembly 2, which comprises cam 5, having cam lever 6 extending therefrom. The cam 5 and cam lever 6 may be one piece or can be two or more separate pieces attached or in communication with one another. Cam follower 7 is also shown in FIG. 3 having an elongate body and housing. At the forward portion of the housing, preferably the front end, the cam follower 7 has contact surfaces 8 extending from each side. Therefore it will be appreciated that while one surface 8 is shown in FIG. 3, there is also a surface on the other side of the cam follower 7. The cam 5 also has two cam contact surfaces 9 each of which will be disposed against the cam follower contact surfaces 8. In other embodiments, there may only be one contact surface on the cam 5 or cam follower 7. In further embodiments the cam follower may have contact surfaces located toward the back or middle of the cam follower 7, and the contact surfaces 8 can be within the cam follower housing.

The cam follower 7 has a lower portion having an elongate aperture 10 which can retain pivot pin 11. Preferably, the elongate aperture 10 is elongate in the longitudinal direction of the cam follower 7 and skewer 4. Pivot pin 11 passes through an aperture 12 of the cam lever 6, as well as pivot aperture 13 of the skewer member 4 and is moveable along the elongate aperture 10.

The lower portion of the cam follower 7 has a front nose portion 14 extending therefrom in the most forward portion of the housing. A spring 15 is shown in FIG. 3 and will be inserted in the front nose portion 14 of the cam follower and front cover housing 16 can be attached to the front of the nose portion 14 thereby enabling the spring 15 inserted therein to bias the cam follower 7 against the cam 5.

As further depicted in FIG. 3 the cam follower 7 has an upper portion in which a lock assembly 17 is insertable and can be integrated with the cam follower 7. In the embodiment shown in FIG. 3, the lock is placed in the rearward portion of the cam follower 7, preferably in the upper portion of the cam follower 7. Furthermore, as shown in FIG. 3, the lock can be a keylock such that when a key is inserted and rotated to the locked position, the lock will interconnect with lock pin 18. Other kinds of locks well known in the art can be used as well, such as combination locks.

Figure 4:
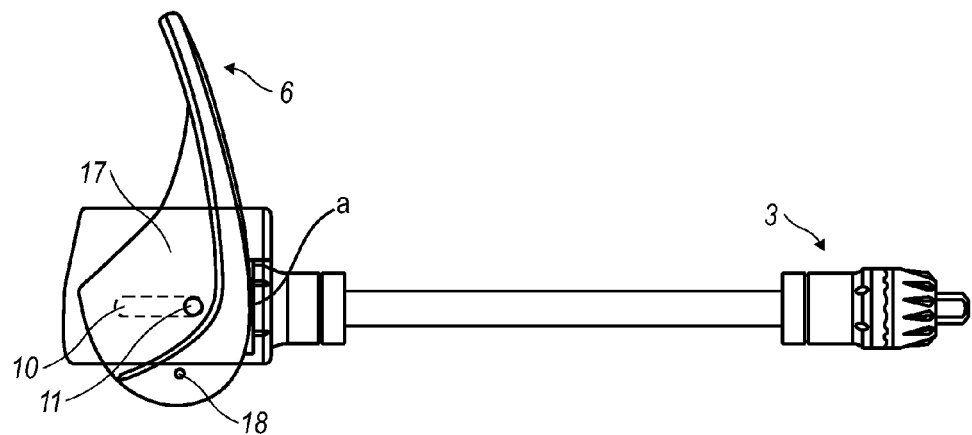
FIG. 4 is a side view of skewer assembly and internals shown in the open configuration in accordance with an exemplary embodiment.
Figure 5:
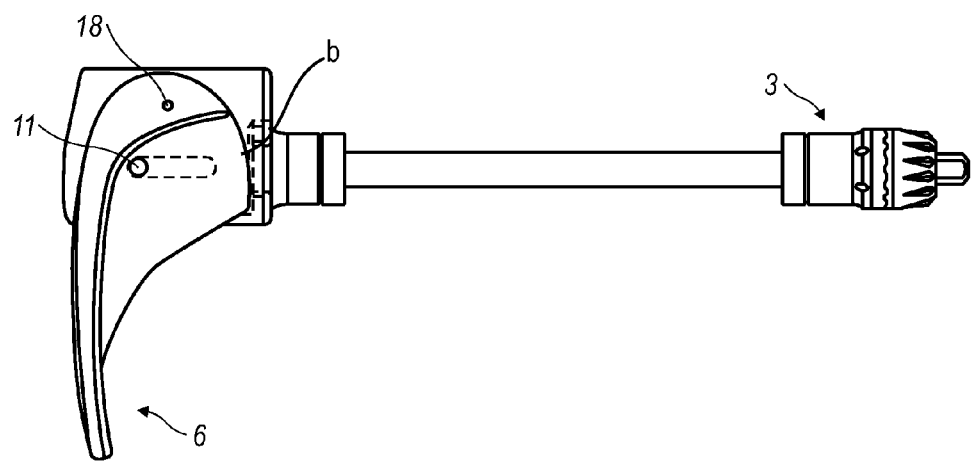
FIG. 5 is a side view of skewer assembly and internals shown in the closed configuration in accordance with an exemplary embodiment.

The cam assembly 2 is moveable between an open configuration and a closed configuration which are shown in FIGS. 4 and 5, respectively. The cam is rotatably moveable about the pivot pin 11 between the two configurations by actuation of the lever 6 extending therefrom. In the open configuration the cam follower 7 is retracted back away from the opposite end of the skewer which has the tightening assembly 3. When in the open configuration, the cam is arranged so that the more narrow portion of the cam is set against the cam follower contact surface 8 at surface contact point a. The narrow portion of the cam is the area between the pivot pin 11 and contact point a. In the closed configuration shown in FIG. 5 the cam follower 7 is extended toward the opposite end of the skewer having the tightening assembly 3. When in the closed configuration, the cam is arranged so that the broader portion of the cam is set against the cam follower surface 8 at surface contact point b.

As the cam 5 is rotated to the closed configuration from the open configuration, the broader portion of the cam 5 forces the cam follower toward the opposite end of the skewer. Additionally, during this time, the cam 5 will be rotated from contact point a to contact point b. The area on the cam surface running from point a to be point b forms a radial contact surface perimeter. The lock pin 18 is located in the area between the radial contact surface perimeter and the pivot pin 11. Therefore, when the cam assembly 2 is moved to the closed configuration, the lock pin is placed in position to interact with the lock assembly 17 which is integrated with the cam follower 7, preferably in the upper portion. The lock assembly 17 can be actuated to lock with the lock pin 18. This action locks the cam assembly in the closed position thereby preventing removal of any bike forks mounted thereon.

Additionally, because the lock pin 18 is within the radial contact surface perimeter and the locking assembly extends to the locking pin while at the same time being maintained within the cam follower 7, the locking action is maintained wholly within the cam follower 7. Accordingly, because the locking mechanism is hidden within the cam follower 7, the possibility of tampering is reduced and the security of the locking mechanism and skewer is improved.

Figure 6:
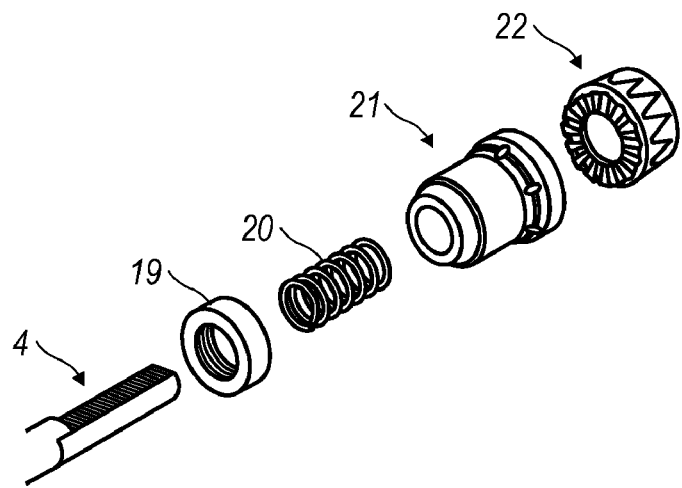
FIG. 6 is a partial perspective view of the tightening assembly disassembled in part in accordance with an exemplary embodiment.

Referring now to FIG. 6, the tightening mechanism 3 is depicted therein, where the blocking member 19 is insertable over the skewer member 4, followed by spring member 20, adjustment housing 21 and ratcheting adjustment nut 22. When assembled, the adjustment nut can be turned to further contract the spring member 20 and tighten the skewer assembly 1. However, the ratcheting adjustment nut 22 acts as a locking nut, and has a ridged surface on its lower face toward the adjustment housing. Due to the ridges, when the adjustment nut 22 is tightened and the skewer in tension, the adjustment nut 22 will bind with the adjustment housing 21 thereby preventing its loosening. Accordingly, the ratcheting adjustment nut 22 is arranged such that it cannot be loosened when the skewer is in tension, i.e. when the skewer assembly 1 is in the closed configuration.

Figure 7:
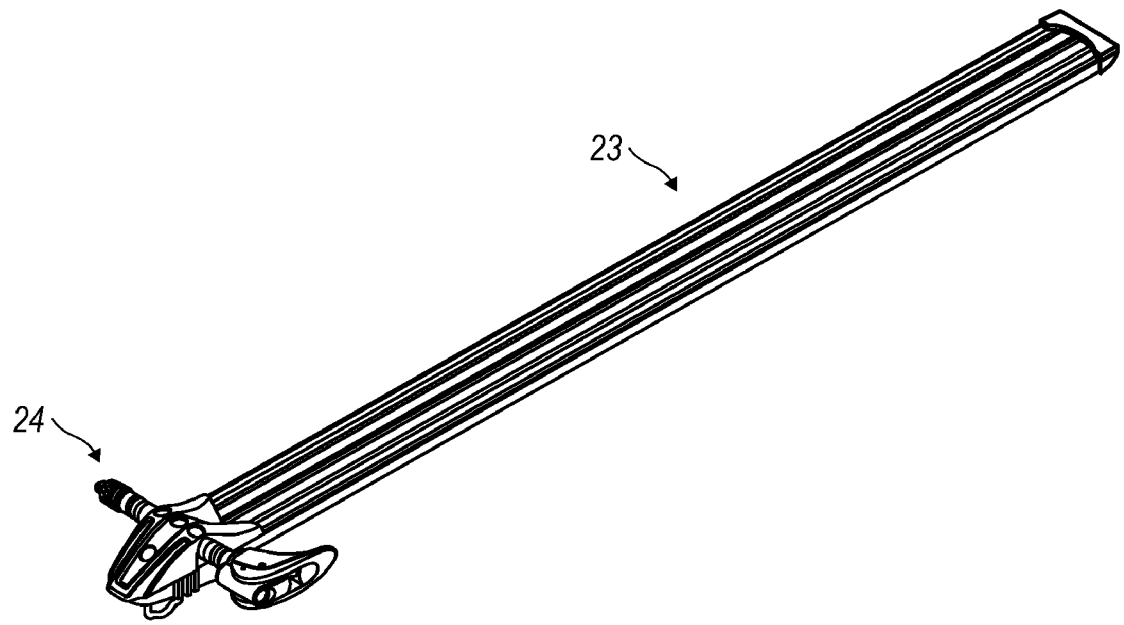
FIG. 7 is a partial perspective view of the skewer assembly and rack mount attached to a bicycle rack in accordance with an exemplary embodiment.
Figure 8:
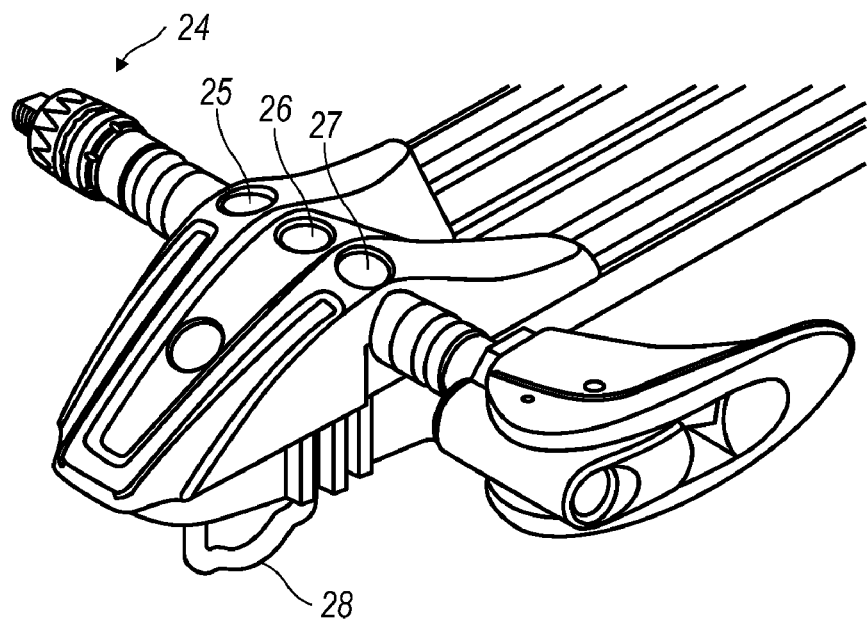
FIG. 8 is a partial perspective view of the skewer assembly inserted into the rack mount in accordance with an exemplary embodiment.
Figure 9:
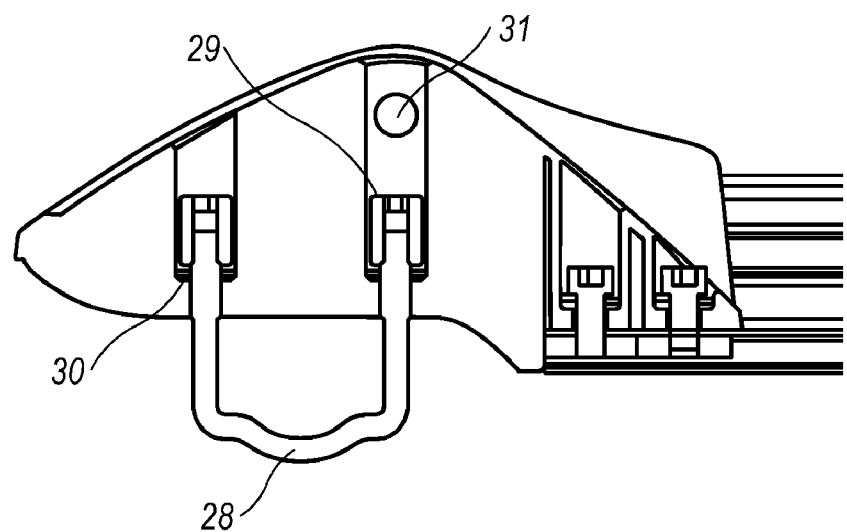
FIG. 9 is a side view of the rack mount in accordance with an exemplary embodiment.

A fully assembled skewer and rack mount attached to the bike rack 23 is shown in FIG. 7. The rack mount 24 with skewer assembly 1 inserted therein is further depicted in FIG. 8. The rack mount 24 has hardware located inside the housing, which is accessible through access holes 25, 26 and 27. As shown in FIG. 9, an attachment U-bolt 28 extends from the bottom portion of the rack mount. The attachment U-bolt 28 has attachment nuts 29 and 30 which attach the U-bolt, as well as the rack mount, to the bicycle rack. For further security, when the skewer assembly 1 is inserted through the rack mount hollow 31, the access holes 25, 26 and 27 are blocked by the skewer member 4. This prevents access to the internal hardware of the rack mount as well as access to the attachment nuts 29 and 30. This provides an additional layer of security with requiring a separate cover.

Thus, in view of the above the skewer assembly 1 has a more secure locking system integrated with the cam follower 7. Additionally, the tightening assembly 3 is prevented from loosening when the skewer is in tension. Furthermore, the skewer assembly 1 coves the rack attaching hardware when inserted into the rack mount, effectively locking the rack mount to the bike rack without the necessity of a separate cover.

What is claimed is:

1. A locking skewer assembly configured for entry through an aperture of a fork mount and receiving forks of a bicycle for mounting thereon, said skewer assembly comprising:
    a longitudinal skewer member having a cam end and an adjustment end each located on opposing ends of said member;
    said cam end having a cam disposed against at least one surface of a cam follower with said cam being rotatably moveable about a pivot point by a lever in communication therewith from an open configuration to a closed configuration wherein said cam follower is moved along said skewer member to a position closer to said adjustment end,
    said cam having a radial contact surface perimeter in contact with said cam follower, said surface perimeter extending from a first point of contact with said cam follower when said cam is in said open configuration to a second point of contact with said cam follower when the cam is in said closed configuration,
    said cam having a locking member located in an area between said contact surface perimeter and said pivot point in both said closed configuration and open configuration, and
    wherein said cam follower has a locking assembly integrated therein and being configurable to lock said locking member in place when said cam is in said closed configuration whereby movement of said cam and cam follower is prevented.

2. The locking skewer assembly of claim 1 wherein the locking member is a lock pin and is received by an elongate aperture in said cam follower, said elongate aperture extending in the same longitudinal direction of the longitudinal skewer member.

3. The locking skewer assembly of claim 1 wherein the cam follower has at least one contact surface extending from a side of a front end of said cam follower with said radial contact surface perimeter being disposed against said cam follower contact surface in both said open and closed configurations, said front end being the cam follower end which receives said longitudinal skewer member.

4. The locking skewer assembly of claim 1 wherein the radial contact surface perimeter comprises two contact surfaces arranged on both sides of said cam follower which are disposed against two contact surfaces of said cam follower in both said open and closed configurations.

5. The locking skewer assembly of claim 1 wherein said lever extends from said cam enabling rotation of the cam by a user.

6. The locking skewer assembly of claim 1 wherein said cam follower contains a nose portion, said nose portion comprising a spring which biases said cam follower against said cam.

7. The locking skewer assembly of claim 1 wherein the adjustment end of the skewer member comprises a ratcheting adjustment nut.

8. A fork mount comprising a locking skewer assembly received through an aperture of said fork mount, said locking skewer assembly configured for receiving forks of a bicycle for mounting thereon, said skewer assembly comprising:
    a longitudinal skewer member having a cam end and an adjustment end each located on opposing ends of said member;
    said cam end having a cam disposed against at least one surface of a cam follower with said cam being rotatably moveable about a pivot point by a lever in communication therewith from an open configuration to a closed configuration wherein said cam follower is moved along said skewer member to a position closer to said adjustment end,
    said cam having a radial contact surface perimeter in contact with said cam follower, said surface perimeter extending from a first point of contact with said cam follower when said cam is in said open configuration to a second point of contact with said cam follower when the cam is in said closed configuration,
    said cam having a locking member located in an area between said contact surface perimeter and said pivot point in both said closed configuration and open configuration,
    and wherein said cam follower has a locking assembly integrated therein and being configurable to lock said locking member in place when said cam is in said closed configuration whereby movement of said cam and cam follower is prevented.

9. The fork mount of claim 8 further comprising at least one access hole in a top portion of said fork mount aligned with said longitudinal skewer member when said skewer member is inserted in said fork mount.

10. The fork mount of claim 8 further comprising an attachment bolt inserted in a bottom portion of said fork mount, said attachment bolt having at least one attachment nut aligned with at least one access hole, wherein access through said at least one access hole to said attachment bolt is blocked by said longitudinal skewer member when the skewer member is inserted in said fork mount.

11. The fork mount of claim 8 wherein the locking member is a lock pin and is received by an elongate aperture in said cam follower, said elongate aperture extending in the same longitudinal direction of the longitudinal skewer member.

12. The fork mount of claim 8 wherein the cam follower has at least one contact surface extending from a side of a front end of said cam follower with said radial contact surface perimeter being disposed against said cam follower contact surface in both said open and closed configurations, said front end being the cam follower end which receives said longitudinal skewer member.

13. The fork mount of claim 8 wherein the radial contact surface perimeter comprises two contact surfaces arranged on both sides of said cam follower which are disposed against two contact surfaces of said cam follower in both said open and closed configurations.

14. The fork mount of claim 8 wherein said lever extends from said cam for rotation of the cam by a user.

15. The fork mount of claim 8 wherein said cam follower contains a nose portion, said nose portion comprising a spring which biases said cam follower against said cam.

16. The fork mount of claim 8 wherein the adjustment end of the skewer member comprises a ratcheting adjustment nut.

* * * * *